United States Patent [19]

Milverton et al.

[11] Patent Number: 4,818,616

[45] Date of Patent: Apr. 4, 1989

[54] OPTICALLY NON-LINEAR MATERIALS AND THIN FILMS INCORPORATING THESE MATERIALS

[75] Inventors: David R. J. Milverton, London; Ian R. Girling, Twickenham, both of England

[73] Assignee: The General Electric Company, p.l.c., England

[21] Appl. No.: 864,264

[22] Filed: May 19, 1986

[30] Foreign Application Priority Data

May 31, 1985 [GB] United Kingdom ............... 8513770

[51] Int. Cl.$^4$ ............ B32B 9/04; G02B 5/18; C08F 8/30; C08C 19/22
[52] U.S. Cl. .................. 428/411.1; 546/329; 525/376; 350/96.34; 350/96.12; 430/321
[58] Field of Search ............ 428/500, 411.1; 525/376

[56] References Cited

U.S. PATENT DOCUMENTS

| | | | |
|---|---|---|---|
| 4,531,809 | 7/1985 | Carter et al. | 430/321 |
| 4,536,450 | 8/1985 | Garito | 428/411.1 |
| 4,647,518 | 3/1987 | Matsuda | 430/19 |

OTHER PUBLICATIONS

"Thermochromic Behaviour of Merocyanine Langmuir-Blodgett Films", by Fukui, et al., 2194 Thin Solid Films, vol. 109 (1983) Nov., No. 3, Lausanne, Switzerland.

"Electrochromism of Metal-Free Phthalocyanine Langmuir-Blodgett Films", by Yamamoto, et al., 362 Japanese Journal of Applied Physics, vol. 24 (1985) May., No. 5, Part 2, Tokyo, Japan.

*Primary Examiner*—P. C. Ives
*Attorney, Agent, or Firm*—Kirschstein, Kirschstein, Ottinger & Israel

[57] ABSTRACT

A multi-layer Langmuir-Blodgett film having non-linear optical properties is described. Alternate layers of the film are composed of first and second elongate chromophore molecules extending transverse to the plane of the film in a Y-configuration. The molecules are sythesised so that when deposited in a Y-configuration they are non-centrosymmetric and therefore exhibit significant optical nonlinearity.

24 Claims, 5 Drawing Sheets

OPTICALLY NON-LINEAR MATERIALS AND THIN FILMS INCORPORATING THESE MATERIALS

BACKGROUND OF THE INVENTION

1. Field of the Invention

The present invention relates to materials with non-linear optical properties, especially although not exclusively Langmuir-Blodgett (L-B) films with such properties, and to optical devices utilising such materials and films.

2. Description of Related Art

A material is optically non-linear if its dielectric constant is a function of the applied electric fields and can be expressed by:

$$\chi_0 + \chi_1 E_1 + \chi_2 E_1 E_2 + \chi_3 E_1 E_2 E_3 + \ldots$$

where $\chi_0, \chi_1, \chi_2 \ldots$ are dielectric susceptibilities of the material, and $E_1, E_2 \ldots$ are the electric fields. The electric fields may be optically applied or may be electrically applied AC or DC fields, or any combination of these depending on the situation. Of the terms $\chi_2, \chi_3 \ldots$ which give rise to non-linearity, $\chi_2$ is usually the largest, and is a function of the molecular hyperpolarisability $\beta$ of the molecules in the material and the orientation of those molecules. $\beta$ is zero if the molecules are centrosymmetric and $\chi_2$ is zero if the arrangement of the molecules in the material is centrosymmetric, irrespective of the value of $\beta$. Thus, in order to provide an optically non-linear material it is necessary to align molecules of high $\beta$ in a non-centrosymmetric configuration.

Known optically non-linear materials include potassium dihydrogen phosphate (KDP), ammonium dihydrogen phosphate (ADP) and lithium niobate (LiNbO₃). However certain organic molecules have larger values of $\beta$ and it is an object of the present invention to provide an improved optically non-linear material in the form of a multi-layer Langmuir Blodgett (L-B) film.

The Langmuir-Blodgett technique for the deposition of thin films involves passing and re-passing a substrate through a thin film of a suitable organic material lying on the surface of a polar liquid such as water, under carefully controlled conditions. An ordered monolayer of the organic material is deposited on the substrate at each pass of the substrate. Suitable organic materials are usually elongate non-centrosymmetric molecules with hydrophilic "heads" and hydrophobic hydrocarbon "tails". Unfortunately the most common mode of deposition (Y deposition) involves the deposition of successive monolayers in a head-to-head and tail-to-tail configuration, which is thus centrosymmetric. It has been found particularly difficult to deposit organic molecules of high hyperpolarisability ($\beta$) in any configuration other than the unwanted head-to-head/tail-to-tail Y configuration.

SUMMARY OF THE INVENTION

According to one aspect of the present invention, a body of optically non-linear material comprises a multi-layer Langmuir Blodgett film, alternate layers of said film being composed of first and second elongate chromophore molecules respectively said molecules extending transverse to the plane of the film in a Y configuration, said first elongate chromophore molecules being of general formula:

and said second elongate chromophore molecules being of general formula:

wherein D and D' are the same or different electron-donor atoms or groups, Ch and CH' are the same or different elongate chromophore groups, A and A' are the same or different electron-acceptor atoms or groups and Hy and Hy' are the same or different hydrophobic groups. Preferably Hy and Hy' are optionally substituted $C_{16}$ to $C_{24}$ hydrocarbon chains. The elongate chromophore groups should absorb at similar wavelengths (preferably with absorption peaks between 500 nm and 800 nm) and suitably include a conjugated hydrocarbon chain and/or one or more aromatic rings. The acceptor A' may comprise a positively charged nitrogen or phosphorus atom for example, which may be incorporated in an aromatic ring of the chromophore group Ch'. The donor D' may be an amine group for example. The acceptor A may be a carbonyl group for example and the donor D may be an amine group for example. Thus the formula of the first elongate chromophore molecules may be:

for example, and the formula of the second elongate chromophore molecules may for example be:

(I)

where $R_1$ and $R_2$ are the same or different and are independently H or optionally-substituted (e.g. OH-substituted) lower alkyl (preferably methyl), n is 16 to 24 and $X^\ominus$ is a compatible anion (preferably halide or sulphate).

According to another aspect of the invention a body of optically non-linear material comprises a multi-layer Langmuir-Blodgett film, alternate layers of said film being composed of electron-donor and electron-acceptor molecules respectively, said molecules incorporating hydrophobic groups and being disposed in a Y-configuration so as to form charge transfer complexes between said alternate layers. Preferably said molecules form aromatic radical cations and anions respectively in the L-B film and incorporate hydrophilic substituents that may be heteroatoms in the rings (such as sulphur or nitrogen for example). Suitable electron-donor molecules are of the general formula:

(II)

where n is 12 to 24 (preferably 16 to 24, e.g. 17). Suitable electron-acceptor molecules are of the general formula:

(III)

where n is 12 to 24 (preferably 16 to 24, e.g. 18).

According to a further aspect of the present invention, a method of making a body of optically non-linear material comprises the steps: (a) depositing alternate layers of compounds of the general formula:

(IV) and (V)

in a Langmuir Blodgett film, $R_3$ and $R_4$ being independently H or the same or different optionally substituted lower alkyls chosen such that the groups are hydrophilic groiups, $C_j$ and $C_j'$ being the same or different optionally substituted conjugated hydrocarbon and/or aromatic groups, D being an electron-donor atom or group, A being an electron-acceptor atom or group, D and/or A being optionally attached to a hydrophilic group, such that said compounds are oriented substantially in the Y-configuration; and (b) exposing said film to hydrazine so as to form conjugated links between said layers which can transmit charge from D to A.

The resulting film has a considerably greater optical non-linearity than the initial Langmuir-Blodgett film because the value of $\beta$ in a conjugated hydrocarbon or aromatic chain is approximately proportional to the cube of the chain length. By coupling the groups $C_j$, $C_j'$ with hydrazine the conjugation is more than doubled; the resulting film is non-centrosymmetric and therefore has a high value of $\chi_2$.

Preferably both D and A are attached to hydrophobic groups (which group may be the same or different). Suitable hydrophobic groups include long-chain hydrocarbon groups such as $C_{12}$ to $C_{24}$ alkyl groups. However in some cases the groups $C_j$ and $C_j'$ may be sufficiently hydrophobic to ensure that the required Y-deposition is achieved, no further hydrophobic groups then being needed.

D may be an amine for example and A may be a pyridinium salt for example.

Molecules of formula I above are believed to be novel per se.

Thus, the present invention also provides a chromophore molecule of the form:

where $R_1$ and $R_2$ are the same or different and are independently H or optionally-substituted (e.g. OH-substituted) lower alkyl (preferably methyl), n is 16 to 24 and $X^\ominus$ is a compatible anion (preferably halide or sulphate).

Apart from its application in forming alternate layers of an optically non-linear multi-layer Langmuir-Blodgett films according to the present invention, such a molecule may find application as an optically non-linear material per se, for example, as a crystal, solvated in an appropriate solvent, as a chromophore host in a liquid crystal, or indeed, in a non-alternating Langmuir-Blodgett multi-layer film, i.e. a multi-layer film in which all the layers are composed of molecules of formula I.

A chromphore molecule of formula I has the advantage compared with known inorganic optically non-linear materials, such as KDP, ADP and $LiNbO_3$ mentioned above, that its optical non-linearity is higher, and compared with the organic chromophore molecules proposed above for use as the said first elongate chromophore molecule of a Langmuir-Blodgett multi-layer film according to the present invention, that it is more stable as well as also probably exhibiting higher optical non-linearity.

The invention includes within its scope an optically non-linear device which incorporates a body of optically non-linear material produced by a method in accordance with the further aspect of the invention or in accordance with any of the other aspects of the invention.

BRIEF DESCRIPTION OF THE DRAWINGS

Embodiments of the invention will now be described by way of example only with reference to FIGS. 1 to 5 of the accompanying drawings of which.

DETAILED DESCRIPTION OF THE PREFERRED EMBODIMENTS

Figure 1:
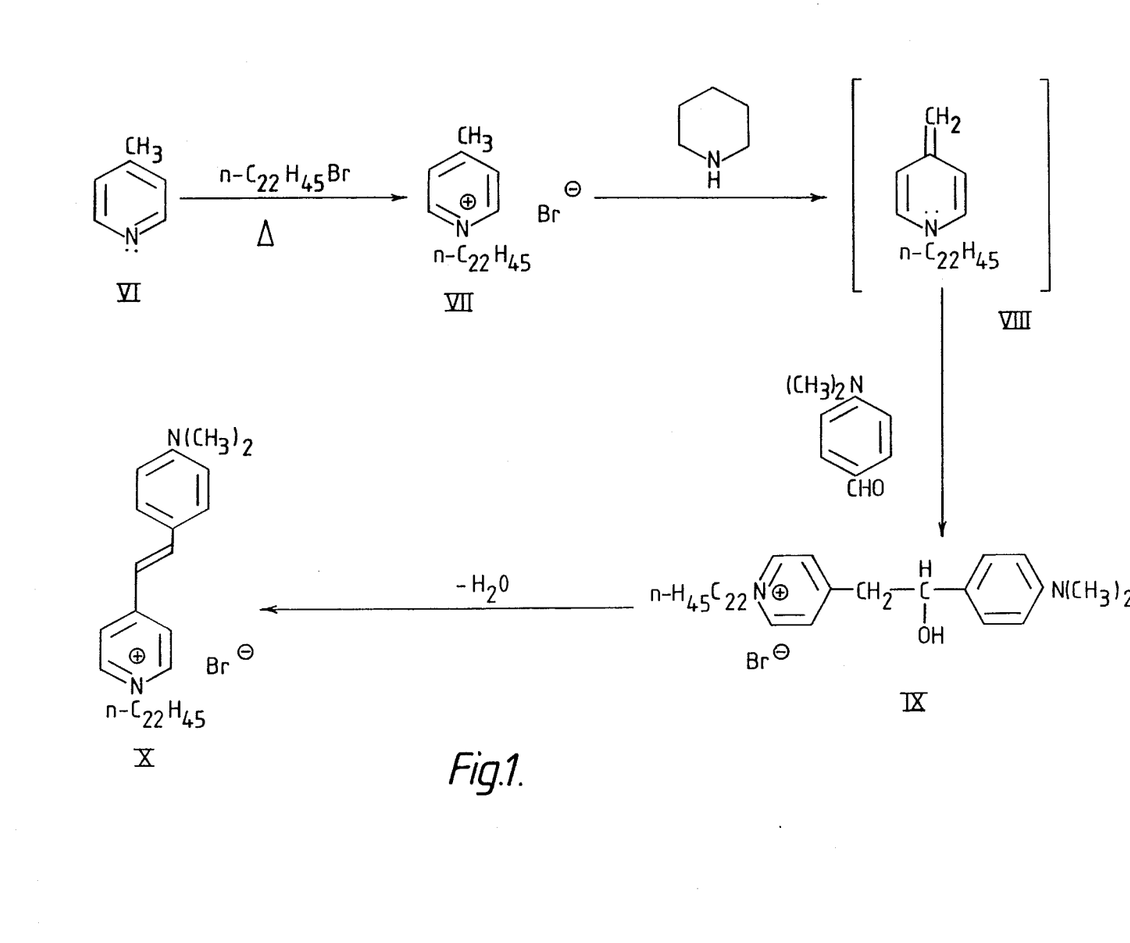
FIG. 1 is a reaction scheme illustrating a novel method of synthesising a stilbazolium dye.

Referring to FIG. 1, γ-picoline (VI) has quaternised with docosyl bromide (n-$C_{22}H_{45}Br$) at 125° C. to produce γ-picolinium docosyl bromide (VII). This compound was then condensed with N,N-dimethyl-p-amino-benzaldehyde in refluxing methanol in the presence of piperidine for 16 hours. This reaction produced the intermediate alcohol IX presumably via an intermediate VIII. The intermediate alcohol IX eliminated water to give the stilbazolium dye X, which crystallised out on cooling the reaction mixture. Dye X was filtered off and purified by repeated recrystalisation from methanol (yield 47%).

The nitrogen atom in the amine group of X is an potential electron donor and the pyridinium nitrogen is a potential electron acceptor. The conjugated hydrocarbon/aromatic chain between these atoms allows charge to flow from the donor nitrogen to the acceptor atom, particularly when the molecular is optically excited, and the molecule therefore has a high molecular hyperpolarisibility $\beta$. Furthermore the straight chain $C_{22}H_{45}$ alkyl group is highly hydrophobic and renders the molecule suitable for deposition as an L-B film, since the amine group is hydrophilic. However any such L-B film is liable to have a Y-configuration, that is to say a configuration in which the amine "heads" of the molecules free each other, as do the $C_{22}H_{45}$ "tails". Such a configuration is centrosymmetric and therefore has a zero value of $\chi_2$ thus it is not of interest in the present context.

Figure 2:
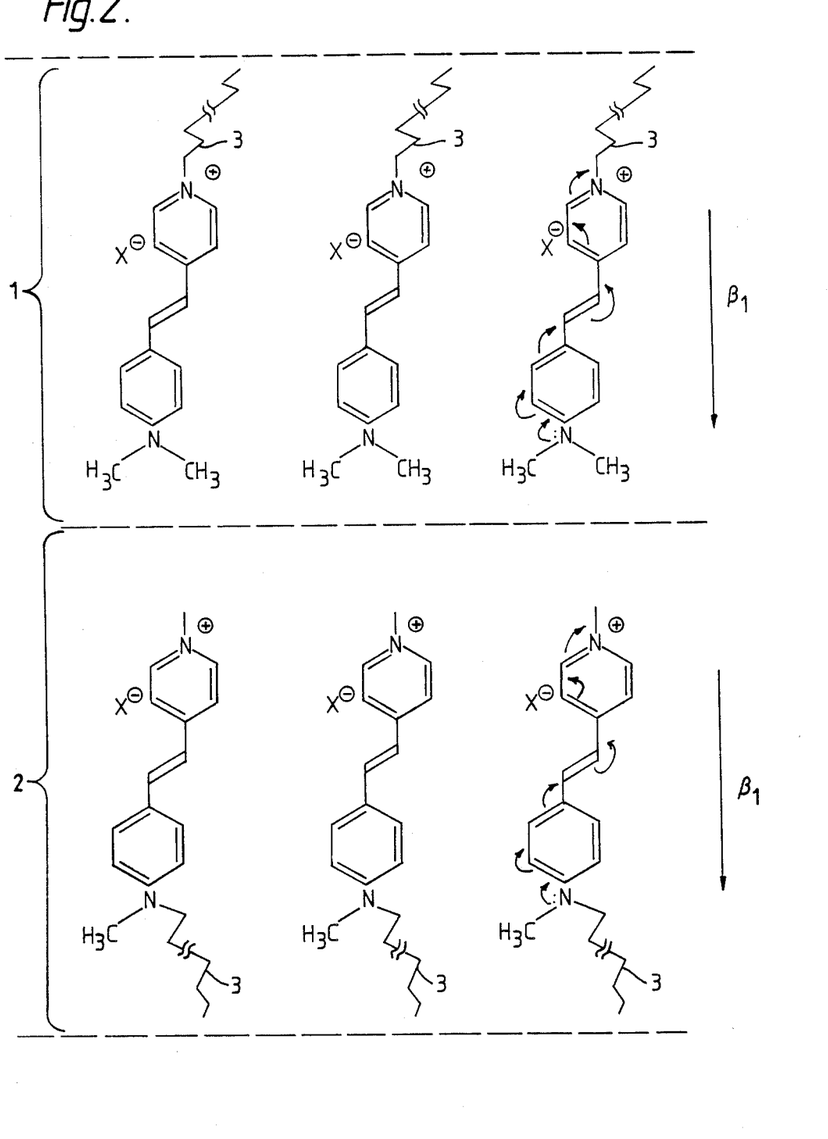
FIG. 2 is a schematic representation of the molecular structure of optically non-linear material incorporating a stilbazolium dye of the type shown in FIG. 1 and in accordance with one aspect of the invention.

However the object of the synthetic route shown in FIG. 1 is to synthesize a molecular which is similar in size and shape to merocyanine dyes (which are known to be capable of L-B deposition) but where the positions of its donor and acceptor atoms or groups can be inverted with respect to the positions of the hydrophobic and hydrophilic groups, in the molecule as illustrated in FIG. 2. Alternate mono layers of the stilbazolium and inverted stilbazolium dyes, when deposited in the Y-configuration, are therefore non-centrosymmetric and thus exhibit a high value of $\chi_2$.

FIG. 2 is a cross-section showing two layers of the L-B film formed by deposition of alternate monolayers of stilbazolium dye (1) and inverted stilbazolium dye (2). The hydrophobic tails 3 are suitably n-$C_{22}H_{45}$ or other long-chain (e.g. $C_{16}$ to $C_{24}$) alkyl groups. $X^\ominus$ may be bromide, halide or other inorganic anion for example. Suitable techniques for depositing L-B films are described in the article "Technological Applications of Langmuir-Blodgett Films" by G. G. Roberts et al, Physics in Technology Vol. 2 (1981) which is hereby incorporated by reference.

Considering the stilbazolium and inverted stilbazolium dye molecules shown on the right hand side of FIG. 2, the electron movements shown occur when light of appropriate wavelength, (approximately 0.6 to 1.5 μm) is transmitted through the film, and correspond to molecular hyperpolarisabilities $\beta_1$ and $\beta_2$ which are associated with the respective dye molecules. Because $\beta_1$ and $\beta_2$ are substantially aligned, they are non-centrosymmetric with respect to any point at the interface 4 between monolayers 1 and 2. The same is true of any other point within the L-B film. Accordingly the material as a whole is optically non-linear—i.e. it has a high value of $\chi_2$.

Figure 3:
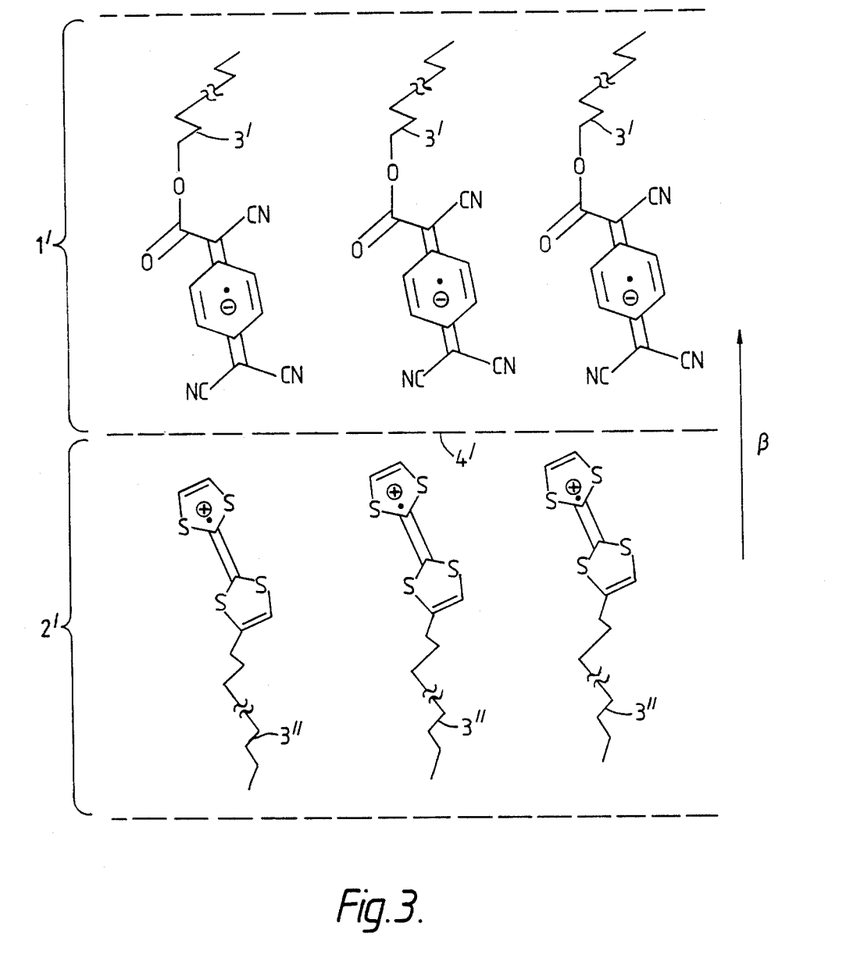
FIG. 3 is a schematic representation of the molecular structure of optically non-linear material in accordance with another aspect of the invention.

FIG. 3 is a cross section through two monolayers 1', 2' of a Y-deposited L-B film in which each hyperpolarisability $\beta$ is associated with a pair of molecules in adjacent layers, which form radical cations and anions respectively. The configuration is clearly non-centrosymmetric with respect to any point at the interface 4' between the layers. The molecules incorporate hydrophobic long chain alkyl groups 3' and 3''. 3' is suitably n-$C_{17}H_{35}$ and 3'' is suitably n-$C_{18}H_{37}$.

Figure 4:
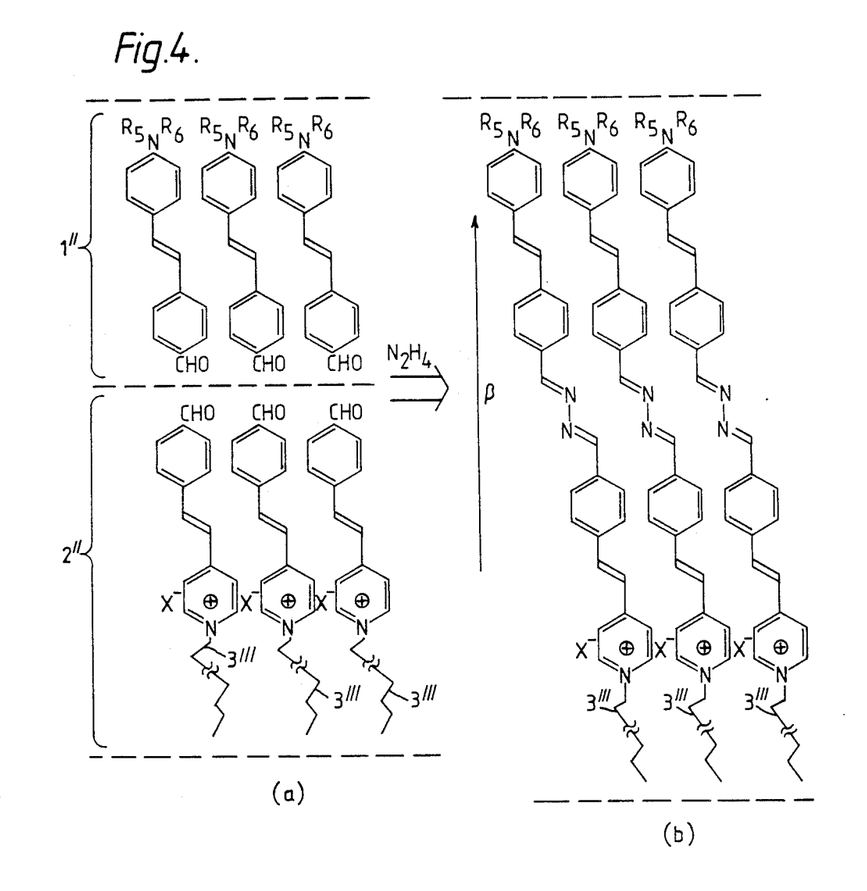
FIG. 4 is a schematic representation of a method in accordance with the invention of forming optically non-linear material.

FIG. 4(a) is a cross section showing a monolayer 1'' of molecules incorporating potential electron-donating amine groups adjacent a monolayer 2'' of molecules incorporating potential electron-accepting pyridinium groups in an L-B film. The latter incorporate hydrophobic long-chain alkyl groups 3''', which are suitably n-$C_{16}H_{33}$ for example. In order to achieve the Y-configuration shown, at least one of $R_5$ and $R_6$ is preferably a long-chain hydrophobic alkyl group. The other of $R_5$ and $R_6$ may be hydrogen or methyl for example. The L-B film of FIG. 4(a), when exposed to hydrazine vapour and gently heated (25° C. to 35° C.) undergoes a condensation reaction of form extremely long conjugated links between the amine and pyridinium groups. The resulting configuration (which is trans with respect to the N-N bonds) is non-centrosymmetric and has a greatly enhanced value of $\beta$, since this parameter is approximately proportional to the cube of the length of the conjugated chain. Thus the material as a whole exhibits a high value of $\chi_2$.

Figure 5:
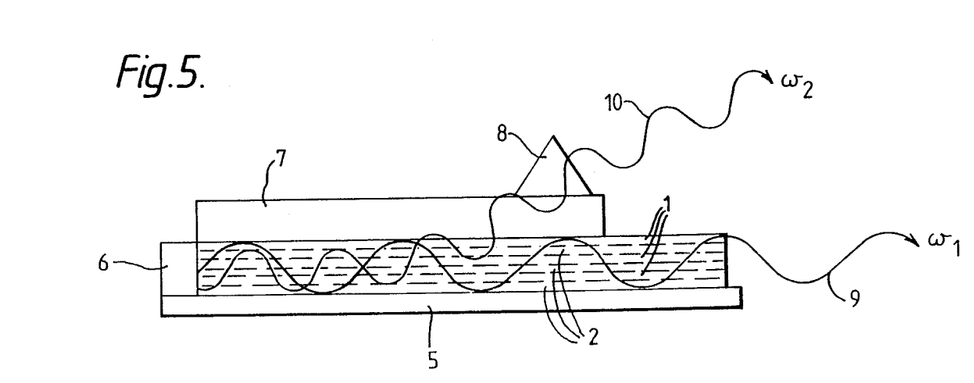
FIG. 5 is a schematic representation of an optical modulator in accordance with the invention incorporating the optically non-linear material of any of FIGS. 2 to 4.

FIG. 5 is a cross-section through a frequency doubler incorporating a large number (e.g. a hundred or more) alternate monolayers 1 and 2 of optical non-linear material of the type described above with reference to any of FIGS. 2 to 4. These monolayers are deposited on a substrate 5 in an L-B film and act as a waveguide for a light beam of frequency $w_1$, generated by a semiconductor laser diode 6. A further L-B film 7 of light transmissive material is deposited on this waveguide and may have a conventional Y-type centrosymmetric molecular configuration. A prism coupler 8 is attached to L-B film 7.

In use, beam 9 which has its electric vector perpendicular to the plane of the monolayers 1 and 2, causes a beam 10 of frequency $w_2 = 2w_1$ to be generated by virtue of the high value of $\chi_2$ in these monolayers.

The material chosen for L-B film 7 is chosen such that its refractive index for frequency $w_2$ is higher than the corresponding refractive index in monolayers 1 and 2—accordingly beam 10 crosses over the L-B film 7 and is coupled out by prism coupler 8. However, the refractive index in monolayers 1 and 2 for frequency $w_1$ is arranged to be higher than the corresponding refractive index in L-B film 7. Accordingly, beam 9 remains undeflected and thus the beams $w_1$ and $w_2$ are separated. The beam 10 may be used to monitor transmission of the beam 9.

We claim:

1. A body of optically non-linear material, comprising a multilayer Langmuir-Blodgett film having molecules extending perpendicular to the plane of the film in a Y configuration, alternate monolayers of said film being composed of first elongate chromophore molecules each having an electron donor-acceptor (D/A) pair and being of the general formula:

and second elongate chromophore molecules each having an electron donor/acceptor pair and being of the general formula:

wherein

D and D' are the same or different electron-donor atoms or groups,

Ch and Ch' are the same or different elongate chromophore groups,

A and A' are the same or different electron-acceptor atoms or groups, and

Hy and Hy' are the same or different hydrophobic groups, whereby the electron donor/acceptor pairs of alternate layers are reversed relative to the respective hydrophobic group so that all of said electron donor-aceptor pairs of said molecules have the same orientation throughout the thickness direction of said Y-configuration film.

2. A body according to claim 1 in which Hy and Hy' are substituted $C_{16}$ and $C_{24}$ hydrocarbon chains.

3. A body according to claim 1 in which the elongate chromophore groups include a conjugated hydrocarbon chain and at least one aromatic ring.

4. A body according to claim 1 in which the acceptor A comprises a positively charged atom incorporated in an aromatic ring of the chromophore group Ch.

5. A body according to claim 1 in which the donor D is an amine group.

6. A body according to claim 1 in which the acceptor A is a carbonyl group.

7. A body according to claim 1 in which the donor D is an amine group.

8. A body according to claim 1 in which the first elongate chromophore molecule is a stilbazolium dye and the second elongate chromophore molecule is an inverted stilbazolium dye.

9. A body according to claim 8 in which the formula of the first elongated chromophore molecule is:

and the formula of the second elongate chromophore molecule is:

where $R_1$ and $R_2$ are the same or different and are independently H or alkyl, n is 16 to 24 and x is a compatible anion.

10. A body according to claim 9 in which said alkyl is methyl.

11. A body according to claim 9 in which said compatible anion is a halide or sulphate.

12. A device incorporating a body as claimed in claim 1.

13. A body according to claim 1, in which the elongate chromophore groups include a conjugated hydrocarbon chain.

14. A body according to claim 1, in which the elongate chromophore groups include at least one aromatic ring.

15. A body of optically non-linear material comprising a multi-layer Langmuir-Blodgett film, alternate layers of said film being composed of electron-donor and electron-acceptor molecules respectively, said molecules incorporating hydrophobic groups and being disposed in a Y-configuration so as to form charge transfer complexes between said alternate layers, whereby the overall configuration of the resultant multilayer film is non-centrosymmetric.

16. A body according to claim 15 in which said molecules form aromatic radical cations and anions respectively in the Langmuir-Blodgett films, and incorporate hydrophilic substituents or heteroatoms.

17. A body according to claim 15 in which the electron-donor molecules are of the general formula:

where n is 12 to 24.

18. A body according to claim 17 in which n is 16 to 24.

19. A body according to claim 15 in which the electron-acceptor molecules are of the general formula:

where n is 12 to 24.

20. A body according to claim 19 in which n is 16 to 24.

21. A device incorporating a body as claimed in claim 15.

22. A method of making a body of optically non-linear material comprising the steps: (a) depositing alternate layers of compounds of the general formulae:

in a Langmuir Blodgett film, $R_3$ and $R_4$ being independently H or the same or different alkyls such that the groups are hydrophilic groups, $C_j$ and $C_j'$ being the same or different substituted conjugated hydrocarbon and/or aromatic groups, D being an electron-donor atom or group, A being an electron-acceptor atom or group, D and/or A being attached to a hydrophilic group, such that said compounds are oriented substantially in the Y-configuration; and (b) exposing said film to hydrazine so as to form conjugated links between said layers which can transmit charge from D to A, whereby the overall configuration of the resultant multilayer film is non-centrosymmetric.

23. A method according to claim 22 in which both D and A are attached to hydrophobic groups.

24. A method according to claim 23 in which the hydrophobic groups include long-chain hydrocarbon groups.

* * * * *